United States Patent
Xu et al.

(10) Patent No.: US 8,308,964 B2
(45) Date of Patent: Nov. 13, 2012

(54) PLANARIZATION METHOD FOR MEDIA

(75) Inventors: Yuan Xu, Santa Clara, CA (US); Wei Hu, San Mateo, CA (US); Justin Jia-Jen Hwu, Fremont, CA (US); Gene Gauzner, San Jose, CA (US); Koichi Wago, Sunnyvale, CA (US); David Shiao-Min Kuo, Palo Alto, CA (US)

(73) Assignee: Seagate Technology LLC, Cupertino, CA (US)

( * ) Notice: Subject to any disclaimer, the term of this patent is extended or adjusted under 35 U.S.C. 154(b) by 219 days.

(21) Appl. No.: 12/895,630

(22) Filed: Sep. 30, 2010

(65) Prior Publication Data
US 2012/0080402 A1    Apr. 5, 2012

(51) Int. Cl.
*B44C 1/22*    (2006.01)
(52) U.S. Cl. ............. 216/22; 216/38; 438/427; 438/692
(58) Field of Classification Search .................... 216/22, 216/38; 438/427, 692
See application file for complete search history.

(56) References Cited

U.S. PATENT DOCUMENTS

| 6,365,523 | B1 * | 4/2002 | Jang et al. ..................... 438/692 |
| 6,586,044 | B1 | 7/2003 | Takeshita et al. ............. 427/129 |
| 2005/0175791 | A1 | 8/2005 | Hattori et al. ................. 427/548 |
| 2009/0305081 | A1 | 12/2009 | Dai et al. .................... 428/833.2 |

* cited by examiner

*Primary Examiner* — Nadine G Norton
*Assistant Examiner* — Mahmoud Dahimene
(74) *Attorney, Agent, or Firm* — Alan G. Rego; Westman, Champlin & Kelly, P.A.

(57) ABSTRACT

A planarization process may planarize a media disk that has data trenches between data features and larger servo trenches between servo features. A filler material layer is deposited on the media disk and provides step coverage of the trenches. The filler material has data recesses over the data trenches and servo recesses over the servo trenches that must be removed to produce a planar media surface. A first planarization process is used to remove the data recesses and a second planarization process is used to remove the servo recesses.

20 Claims, 14 Drawing Sheets

PLANARIZATION METHOD FOR MEDIA

FIELD

This disclosure is related to a method for planarizing media.

BACKGROUND

Magnetic recording media may be used in disk drives. The surfaces of the media may need to be very smooth for proper operation of the magnetic transducer head relative to the media. Patterned recording media may be planarized to produce a smooth surface.

BRIEF DESCRIPTION OF THE DRAWINGS

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

DETAILED DESCRIPTION

Figure 1:
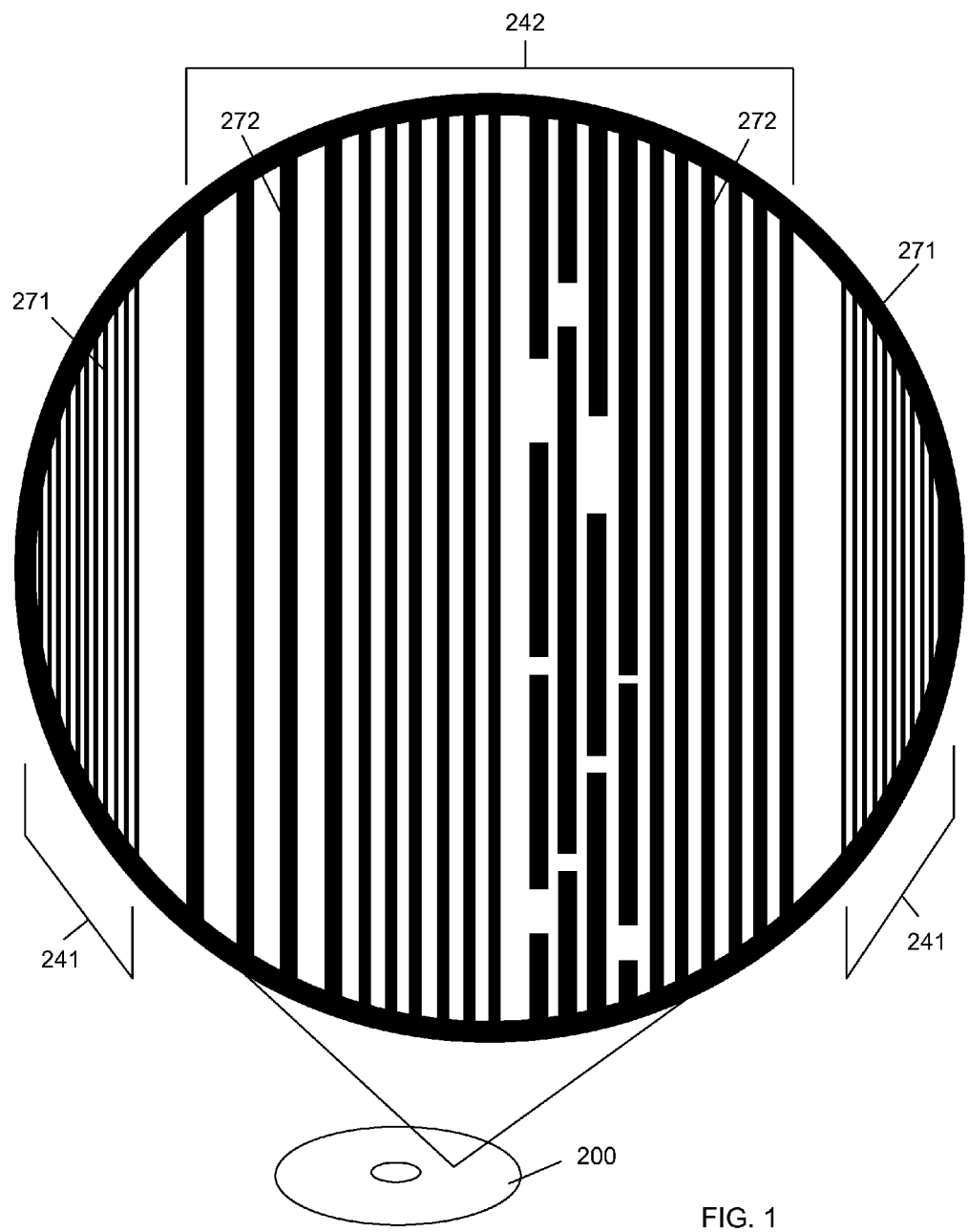
FIG. 1 illustrates an enlarged view of a portion of a DTR media disk.

Disk drives include rotating recording media and a head that may record data to the media and may read data from the media. The head may be attached to an arm that may move the head across the radius of the disk. By rotating the disk and moving the arm across the disk, the head may be positioned over any portion of the disk surface. The movement of the disk under the head may cause air to flow under the head so the head flies over the spinning magnetic recording media. The head may fly in a very stable manner when the surface of the media may be smooth. However, if the media surface has any defects such as depressions and/or protrusions, the flying head may become unstable which may result in read or write errors and potential damage if the head contacts the rotating media. The media can store data magnetically or optically.

Magnetic media may be formed by depositing several layers of different materials on a substrate. Because the material layers may be deposited uniformly across the media, it may be possible to produce a smooth surface. In contrast, surface defects may be more likely to occur in discrete track recording media (DTR media) or bit patterned media (BPM)

because different areas of the media have different features and may be formed from different materials deposited in the same plane. For example, DTR media may include recesses or trenches formed in the surface of the media and BPM may include hard magnetic islands surrounded by non-magnetic filler material. Because the upper layers may not be homogeneous, there may be more potential for surface variations.

In some DTR media embodiments, a layer of magnetic material may be deposited on the media substrate and etched to form the servo and data tracks. Material may be deposited between the servo and data tracks so the adjacent magnetic data tracks may be separated by data trenches and the adjacent servo tracks may be separated by servo trenches. The data and servo trenches may then be filled with a filler material such as a dielectric or non-magnetic material. The filler material completely fills the trenches and covers the top surface of the media. Due to the trenches, the upper surface of the filler material on the media may not be planar. If the upper surface is improperly planarized, the upper surface of the media may have depressions and/or protrusions that may reduce the flying stability of the magnetic read/record head as it travels over these areas. Precise planarization of the patterned magnetic media may reduce head modulation and may also oprimize the flyability of the head.

The planarization of the patterned media upper surface may be particularly difficult when the features on the media are not uniform in size. For example, DTR media may have separate data and servo features with different dimensions, however, both the data and servo features may include circular trenches formed in the media substrate. The data trenches form the data recording areas on the media and may be uniform in size so the depth, width and aspect ratio (ratio of the depth to width) of each data trench may be substantially the same. In contrast, the servo trenches may be substantially larger (wider trench bottom width dimensions) than the data features and may have a broad range of feature sizes. The servo trenches may have various depths, widths and aspect ratios. Since the topographical features may have different sizes over different areas of the media, the filling and planarization of the different-size servo and data features pose technical challenges.

FIG. 1 illustrates an embodiment of a DTR media 200 with a portion shown in magnified detail. The magnetic material 202 may be arranged in data tracks 271 and servo tracks 272 that may be circular and extend around the DTR media 200. The data tracks 271 may be located in data regions 241 and the servo tracks 272 may be located in servo track regions 242 of the DTR media 200. The data tracks 271 may be thinner and spaced closer together than the servo tracks 272. The spaces between the data tracks 271 may be data trenches 215 and the spaces between the servo tracks 272 may be servo trenches 211. The data trenches 215 and servo trenches 211 may be filled with a non-magnetic filler material. The upper surface of the filler material may be planar with the data tracks 271 and servo tracks 272 so that the upper surface of the DTR media 200 may be smooth which allows the read/write head of a disk drive to fly in a steady state manner over the media.

Figure 2:
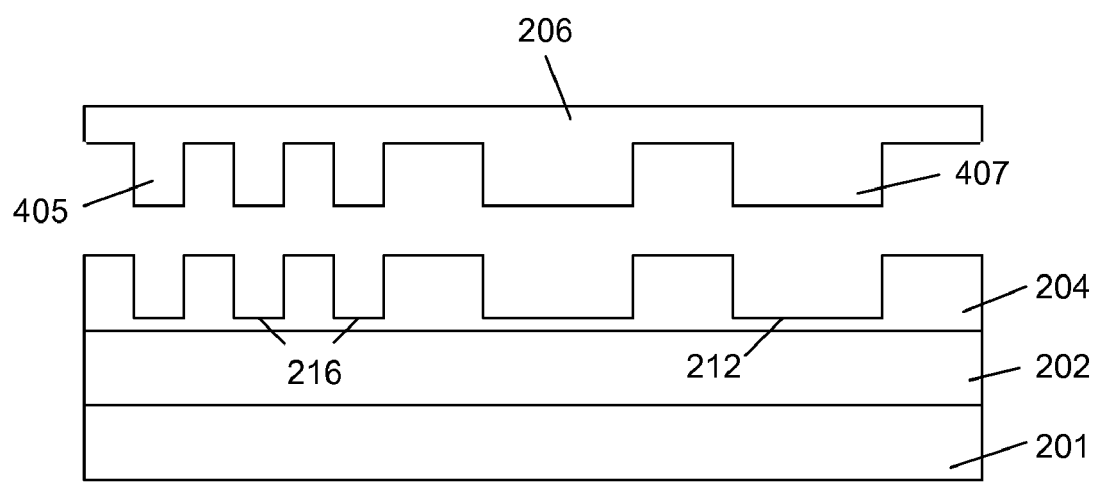
FIG. 2 illustrates a cross section of a media having a patterned resist formed by a stamper.

FIG. 2 illustrates a cross section of a portion of a magnetic media having a substrate 201 and a magnetic layer 202. The substrate 201 may be made of glass, aluminum, silicon or other suitable materials. The hard magnetic layer 202 may be made of a hard magnetic material that may include: one or more elements selected from the group consisting of Co, Cr, Fe, Ta, Ni, Mo, Pt, W, Cr, Ru, Ti, Si, O, V, Nb, Ge, B, and Pd.

An imprint resist layer 204 may be formed over the magnetic layer 202. In an embodiment, the imprint resist layer 204 may be a thermoplastic polymer such as siloxanes that may be spin coated onto the magnetic layer 202. A rigid or a flexible stamper 206 having a patterned surface with servo trench features 405 and data trench features 407 may be pressed into the imprint resist layer 204 to emboss the pre-determined stamper pattern in the resist 204. The resist 204 may be cured by heat or exposure to ultra violet (UV) light while the stamper 206 may be in contact with the resist 204. After the resist layer 204 has been cured, the stamper 206 may be removed, leaving the pattern of servo trench features 212 and data trench features 216 in the resist layer 204. In an embodiment, the DTM media may have a track density of about three hundred fifty thousand tracks per inch (350,000 kTPI). Thus, there may be 350,000 data trenches per inch in a radial direction on the media. Each track may be circular and each track may extend around the media substrate 201.

Figure 3:
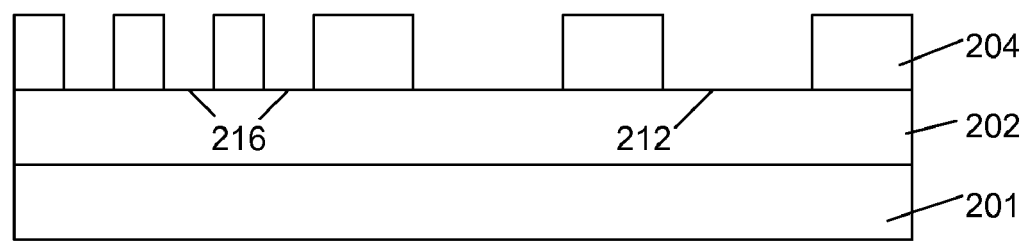
FIG. 3 illustrates a cross section of a media having a descummed patterned resist.

With reference to FIG. 3, a descumming process may be used to remove the resist material 204 from the bottom portions of the servo trench features 212 and data trench features 216 in the resist layer 204. The descumming may be performed by a plasma process that bombards the resist with ions to remove the small amount of resist particles at the bottoms of the servo trench features 212 and data trench features 216. For example, an argon plasma may remove the residual resist through physical impact. Alternatively, an oxygen plasma may remove the residual resist through physical impact and a chemical reaction. In other embodiments, other suitable descumming processes may be used.

FIG. 3 shows an embodiment of the magnetic media after the residual resist material 204 has been removed from the bottom portions of the servo trench features 212 and data trench features 216. Once the residual resist material 204 has been removed, the hard magnetic layer 202 may be etched. In other embodiments, various other suitable lithography processes may be used to pattern the resist layer deposited on the substrate. For example, photolithography, electron beam lithography, x-ray or projection lithography or other patterning processes may be used to form a patterned photoresist layer 204 on the hard magnetic layer 202.

Figure 4:
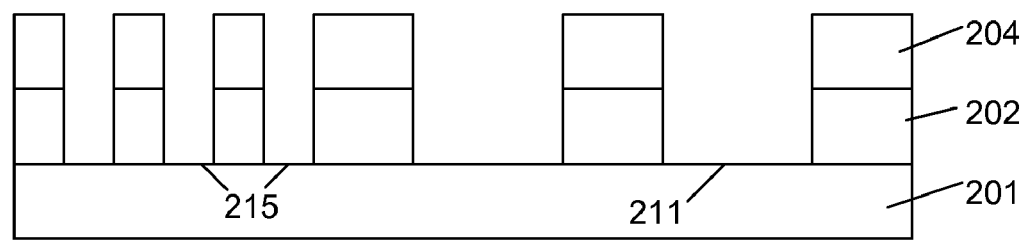
FIG. 4 illustrates a cross section of a media having a magnetic layer with etched trenches.

With reference to FIG. 4, an anisotropic etch process may be performed to etch the servo trenches 211 and data trenches 215 into the magnetic layer 202. The selective etching technique for use in a given application may depend upon the particular combination of the hard magnetic material 202 and the resist mask layer 204, and may, for example, be selected from among wet chemical and dry etching techniques, the latter including reactive plasma, ion beam, or sputter etching methodologies. During the etch processing, the hard magnetic material 202 may be selectively removed at a faster etch rate than the resist layer 204.

Figure 5:
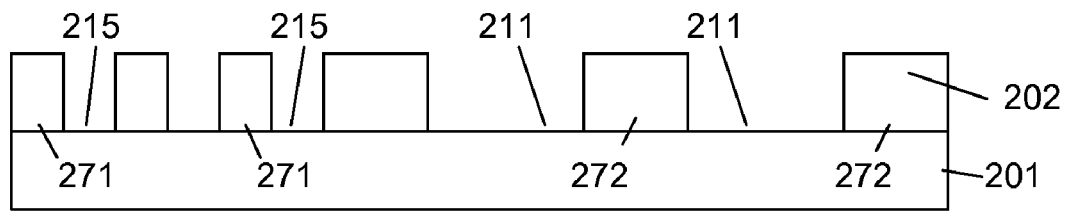
FIG. 5 illustrates a cross section of a media having trenches after the resist may be removed.

FIG. 5 shows a cross section of an embodiment of a discrete track media (DTM) substrate 201 after the resist material has been removed. The process used to remove the photoresist layer 202 may depend upon the type of resist material being used. In an embodiment, the resist may be removed by using a plasma ashing process such as an oxygen ($O_2$) reactive ion etching (RIE). In a RIE process, the media may be placed in a vacuum chamber and exposed to an oxygen plasma which may remove the resist 351 from the hard magnetic material layer 202, but may not remove or damage the magnetic material 202. In other embodiments, any other suitable resist material removal process may be used. Large servo trenches 211 may be formed between the magnetic servo tracks 272 and smaller data trenches 215 may be formed between the magnetic data tracks 271 on the substrate 201. The servo trenches 211 may have a width of about 100 nm or less while the data trenches 215 may have a width of about 30 nm or less.

Figure 6:
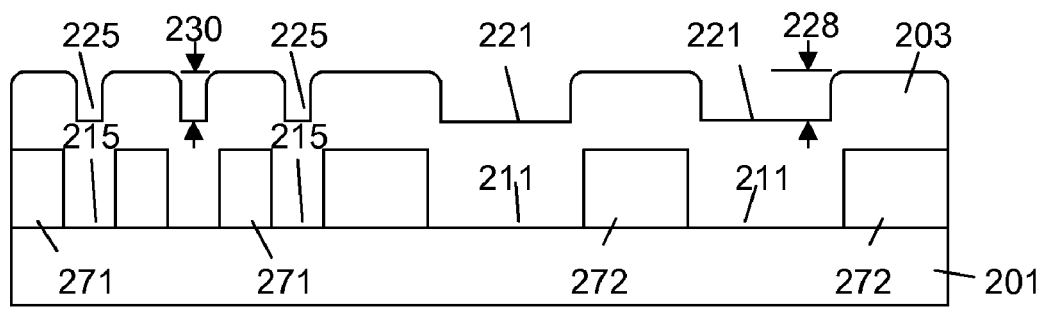
FIG. 6 illustrates a cross section of a media with filler material deposited over the trenches.

With reference to FIG. 6, in order for the upper surface of the media to be smooth and suitable for read/write head flyability in a disk drive, the servo trenches 211 and the data trenches 215 may be filled with a filler material (dielectric or non-magnetic). The deposition of the filler material 203 may result in step coverage of the servo features 272 and data features 271. The servo trenches 211 and data trenches 215 may be completely filled with the filler material 203. The different-sized trenches 211, 215 may cause the upper surface of the filler material 203 to have recesses 221 over the servo trenches 211 and recesses 225 over the data trenches 215. After the filler material 203 deposition, the depths of the recesses 230 over the data trenches 215 may be substantially the same as the depths of the recesses 211 over the servo trenches 211. The thickness of the filler material 203 may be about 30-40 nm and the depths of the recesses 230, 228 may be about 10-20 nm deep.

Figure 7:
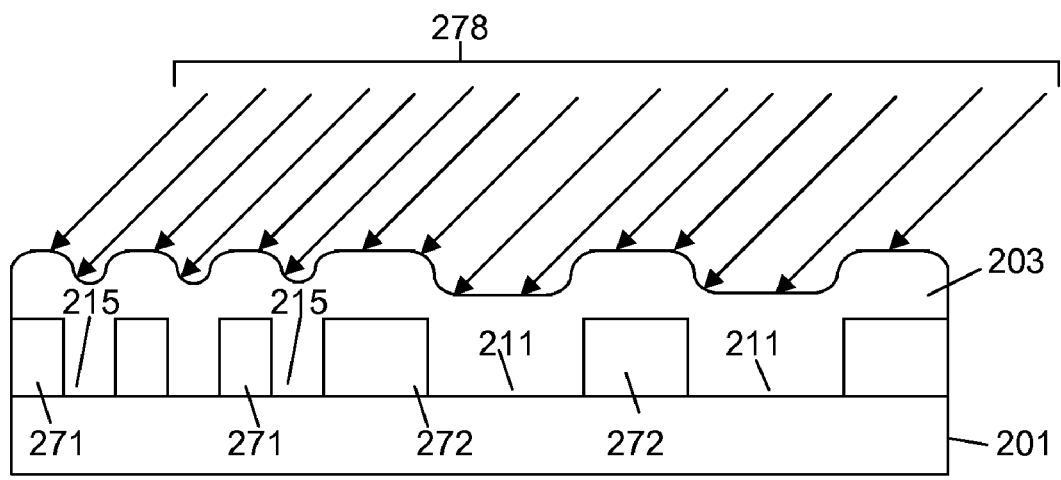
FIG. 7 illustrates an ion beam etch (IBE) of the filler material on a media.
Figure 8:
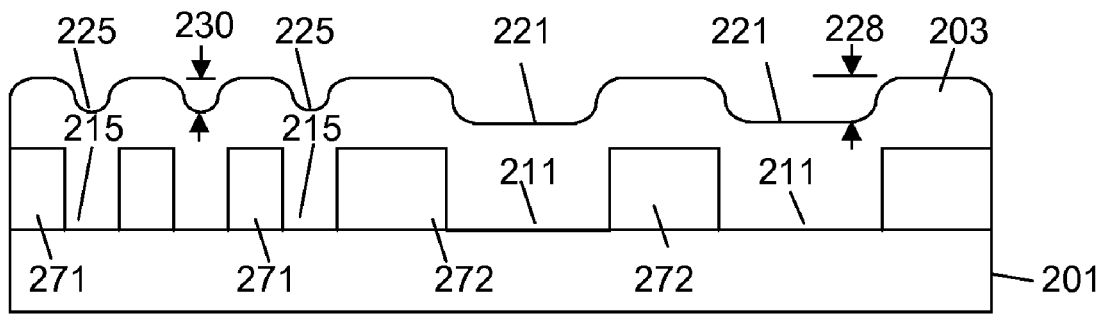
FIG. 8 illustrates a cross section of a media with a first filler material partially planarized by the IBE.

With reference to FIGS. 7 and 8, in order to smooth the upper surface of the media, the filler material layer 203 may be planarized using a high angle ion beam etch (IBE) process such as ion milling. In an embodiment, a noble gas such as argon may be used for the ion beams 278. Beams of argon ions 278 may be directed towards the substrate at an angle and the physical impact of the ions removes material from the filler material layer 203 to planarize the upper surface. Because the ion beams may be directed at an angle relative to the upper surface, the filler material 203 at the bottom of the low aspect ratio recesses 225 over the data trenches 215 may be protected from the ion beam. In contrast, the higher aspect ratio recesses 221 over the servo trenches 211 may be wider and less protected by the servo tracks 272. Because the recesses 221 over the servo trenches 211 may be more exposed to the ion beam, these recesses 221 may be etched during planarization. The angle of the ion beams may be about 2 to 70 degrees, although higher and lower angles may also be suitable. After IBE, the depth 230 of the recesses 225 over the data trenches 215 may be reduced while the recesses 221 over the servo trenches 211 may remain substantially the same.

In an example, the depths of the recesses 230, 228 before IBE planarization may be about 12 nm deep. After IBE planarization, the recess depth 230 over the data trenches 215 may be less than about 10 nm while the recess depth 228 over the servo trenches 211 may remain about 12 nm. In other embodiments other planarization processes may be used. For example, it may be possible to planarize the filler material using other processes such as chemical mechanical polishing (CMP). However, these other planarizing methods may be too expensive and time consuming for commercial magnetic media production.

Figure 9:
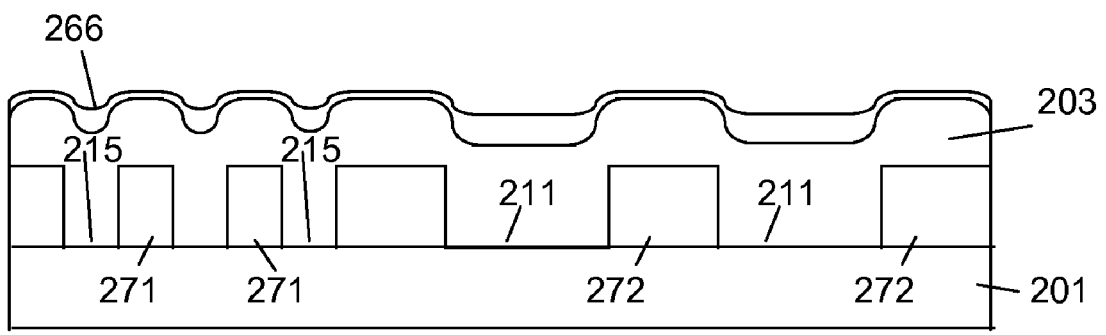
FIG. 9 illustrates a cross section of a media with a protective layer over a single filler material layer.

With reference to FIG. 9, in an embodiment the magnetic media may be completed after the first layer of filler material 203 has been deposited and planarized. A protective carbon layer 266 may be deposited on the top surface of the filler material 203 that acts as a protective coating and prevents damage to the media in the event of physical contact with a disk drive head. However, the upper surface of the carbon layer 266 may not be perfectly planar.

Figure 10:
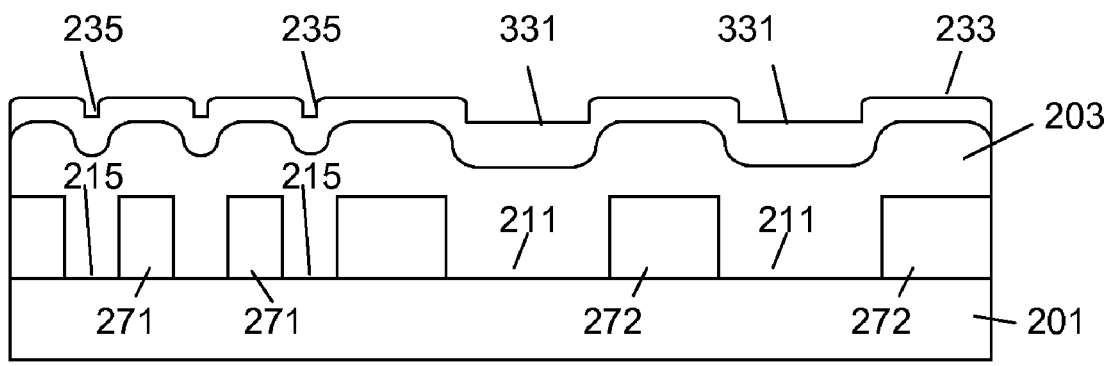
FIG. 10 illustrates a cross section of a media after the deposition of a second filler material layer.

With reference to FIG. 10, in other embodiments, the smoothness of the filler material 203 surface may be optimized by not depositing the carbon layer and adding a second layer of filler material 233 over the first layer of filler material 203. The second layer of filler material 233 may further reduce the size of the recesses 235 over the data trenches 215 and recesses 331 over the servo trenches 211. In other embodiments, the second layer of filler material 233 may be deposited over the first layer 203 without planarizing the first layer 203.

Figure 11:
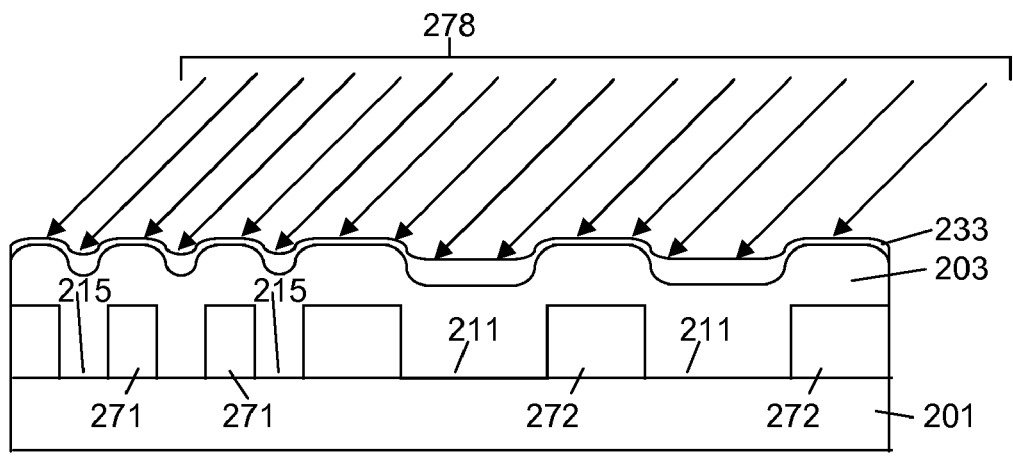
FIG. 11 illustrates an IBE of the second filler material on the media.
Figure 12:
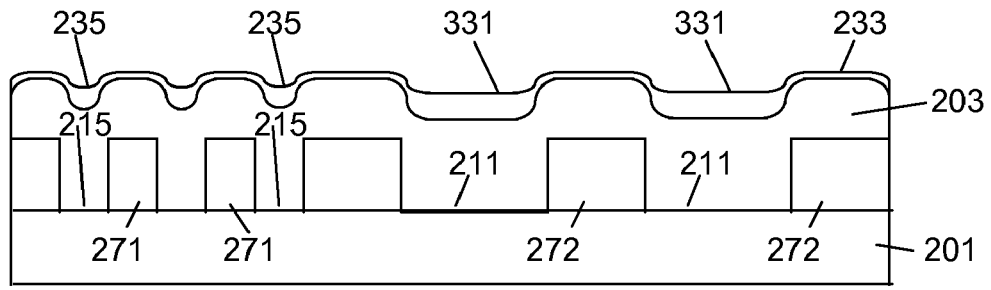
FIG. 12 illustrates a cross section of a media with a second filler material partially planarized by the IBE.

With reference to FIGS. 11 and 12, an IBE process may be used to smooth the second filler layer 233. The IBE process may use an argon ion beam 278 described above with reference to FIG. 7 to remove more material from the higher aspect ratio recesses 331 over the servo trenches 211 than the lower aspect ratio trenches 235 over the data trenches. After the second filler layer 233 has been deposited and planarized, the upper surface may be smoother and the recesses 235, 331 may be smaller.

Figure 13:
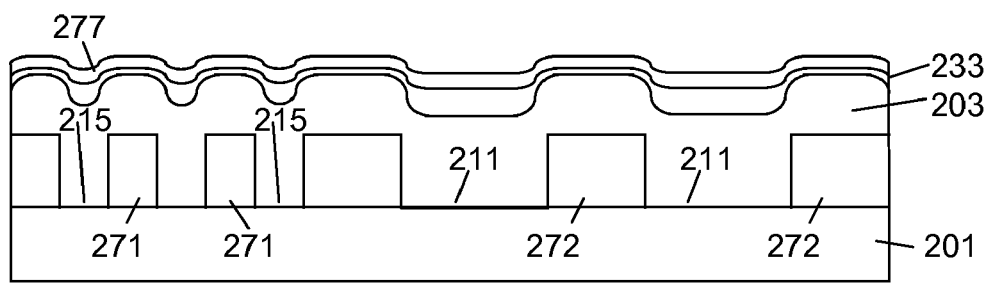
FIG. 13 illustrates a cross section of media with a protective layer over a single filler material layer.

With reference to FIG. 13, a protective layer of carbon 277 may be deposited over the planarized second filler layer 233. However, variations in the upper surface may still exist. In an embodiment, the target smoothness of the upper surface may be an (roughness measurement system) RMS<1 nm. Thus, even with the deposition and planarization of the second filler material 233, the surface of the DTR media 201 may have height variations that may destabilize the read/write head flying over the media 201.

Figure 14:
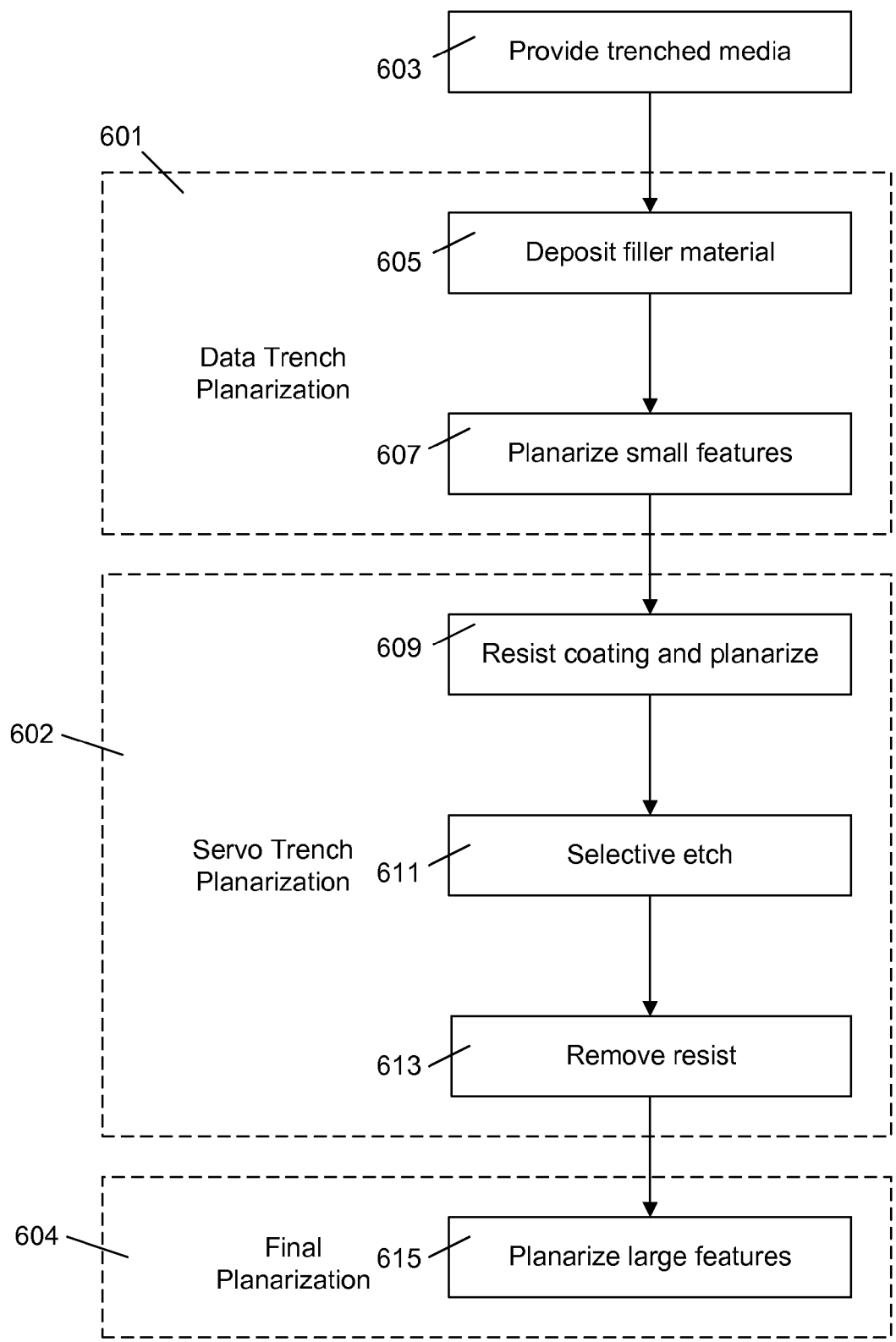
FIG. 14 illustrates a flowchart showing a planarization process.

In order to optimize the planarization of the DTR media surface, a planarization method may be performed that utilizes different planarization processing for the data trench areas of the media and the servo trench areas of the media. FIG. 14 illustrates a flow chart of processes for a planarization method. At 603, a DTR media having data trenches and servo trenches may be provided. As previously described, the servo trenches may be significantly wider and have a larger aspect ratio than the data trenches. Per 605, a filler material may be deposited on trenched media filling the servo trenches and the data trenches. Because the filler material layer conforms to the topography of the underlying substrate, the filler material layer may have recesses over the servo trenches and the data trenches. At 607, an ion beam etch may be used to planarize the substrate and remove the low aspect ratio recesses in the filler material layer over the data trenches, but the planarization may not remove the recesses over the servo trenches.

At the start of the second planarization, targeting the larger recesses above the servo trenches, at 609, a resist layer may be deposited over the entire media surface filling the recesses in the filler material layer over the servo trenches. The resist layer may also be planarized. Because the resist layer may fill the servo trenches, the thickness of the resist layer may be greater over the recessed servo trenches. The upper surface of the media may be selectively etched 611. The selective etch may uniformly remove the resist material from all exposed areas of the media. The thinner areas of resist may be completely removed and the resist may remain over the servo trenches. The etch may then remove the exposed filler material. The selective etch may be stopped when the upper surface of the filler material layer over the data trenches may be approximately planar with the filler material over the servo trenches. At 613, the remaining resist material may be removed from the media. At 645, a final planarization may be applied to the entire media to create a smooth and even upper media surface. Additional finish processing may be performed on the media such as applying a protective coating before the media may be used in a disk drive.

The described processes may be divided into at least two distinct planarizations. The first planarization 601 planarizes the filler material over the smaller data features and a second planarization 602 planarizes the filler material over the larger servo features. The first data trench planarization 601 includes the filler deposition process 605 and the first planarization process 607 to reduce smaller features. The servo trench planarization includes the resist coating 609, the selective etch 611 and the resist removal 613. A final planarization process 603 may also be performed on the entire DTR media after the first planarization 601 and the second planarization 602 have been completed. Examples of the various processes that may be used in the planarization process described below.

Figure 15:
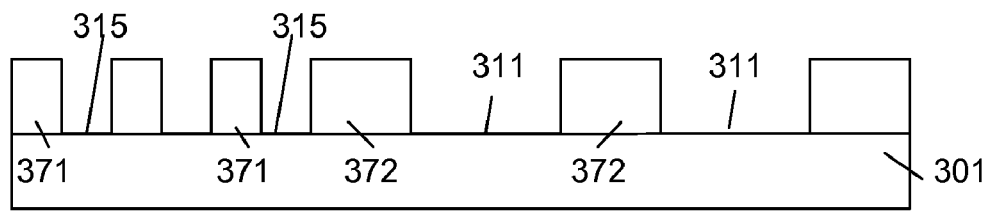
FIG. 15 illustrates a cross section of a magnetic DTR media with trenches in the upper surface.

With reference to FIG. 15, the substrate 301 has been processed as described above with reference to FIGS. 2-5 above to form data trenches 315 between the magnetic material data tracks 371 and servo trenches 311 between the magnetic material servo tracks 372. In an embodiment, the width of the data trench 315 may be about 30 nm and the width of the servo trench 311 may be about 100 nm. The depths of the trenches may be about 15 nm deep. In other embodiments, the aspect ratio of the data trenches 315 may be about 2-4 and the aspect ratio of the servo trenches 311 may be about 2-20. The magnetic material used to form the data tracks 371 and the servo tracks 372 may be CoCrPt, FePt, or any other suitable hard magnetic material. The magnetic direction of the magnetic material in the data tracks 371 and the servo tracks 372 may be perpendicular to the plane of the substrate 301.

Figure 16:
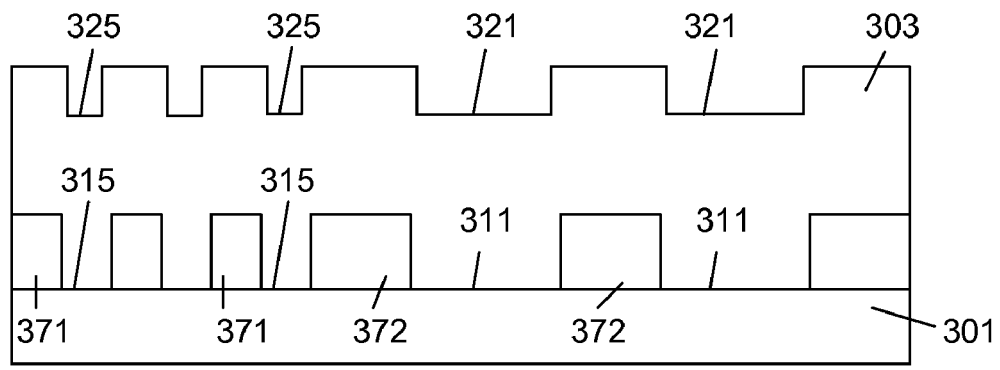
FIG. 16 illustrates a cross section of media with a layer of filler material deposited on the upper surface.

With reference to FIG. 16, a layer of filler material 303 may be deposited over the substrate 301 to fill the servo trenches 311 and the data trenches 315. Because the filler material provides step coverage of the substrate 301 topography, the top surface of the filler material 303 has small data recesses 325 above the data trenches 315 and larger servo recesses 321 over the servo trenches 311.

The filler material 303 may be selected from the group comprising silicon nitride ($SiN_x$) silicon dioxide ($SiO_2$), nickel-tantalum (NiTa) or other suitable filler materials, and mixtures thereof. The filler material 303 may be deposited on to the upper surface of the substrate. The filler material 303 deposition may be optimized for small feature gap filling and topography reduction. Suitable deposition processes may include: chemical vapor deposition (CVD), plasma enhanced chemical vapor deposition (PECVD), physical vapor deposition (PVD), and other suitable deposition methods, or according to subsequently developed deposition processes.

Figure 17:
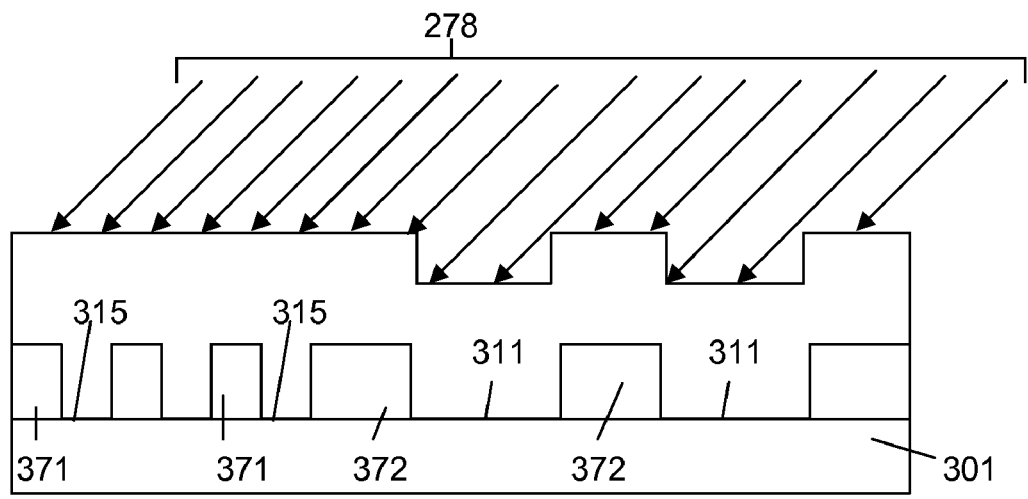
FIG. 17 illustrates an IBE of the filler material on the media.
Figure 18:
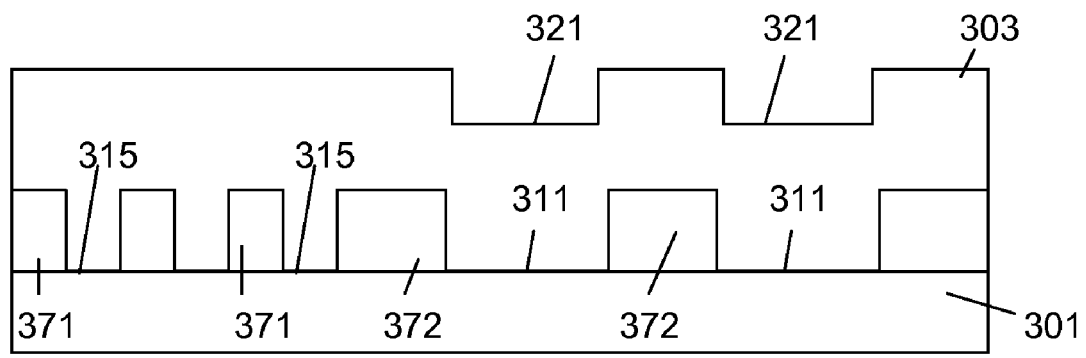
FIG. 18 illustrates a cross section of a media with a filler material partially planarized by the IBE.

With reference to FIGS. 17 and 18, in the first planarization, corresponding to the data trench planarization 601 of flowchart of FIG. 10, the filler material 303 may be planarized. In an embodiment, the first planarization of the filler layer may be performed using an IBE process using ion beams 278 of a noble gas such as argon as described above with reference to FIG. 7. Because the data recesses 325 have a low aspect ratio, the angle of the ion beams 278 may remove the smaller data recesses 325 over the data trenches 315. However, the larger servo recesses 321 over the servo trenches 311 may be etched during the IBE processing and may still exist after the planarization. The filling of the data trenches 315 with the filler material 303 and the planarization of the smaller recesses 325 constitute the first portion of the process, according to an embodiment.

Figure 19:
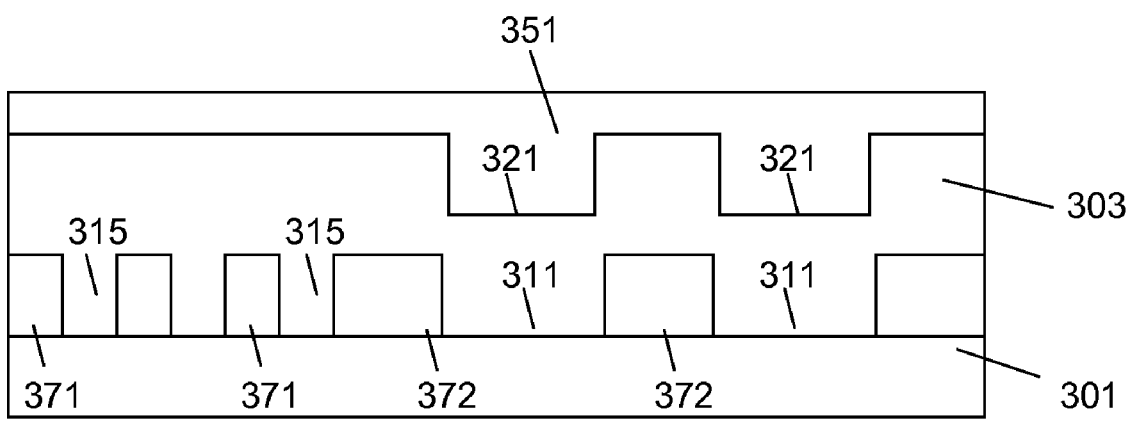
FIG. 19 illustrates a cross section of a media with resist material deposited over the filler material.

As shown in FIG. 19, after the planarization the data recesses in the filler material 303 over the data trenches 315 have been removed, a liquid resist material 351 may be applied over the filler material 303. The resist material 351 fills the servo recesses 321 remaining over the servo trenches 311 and may also cover the rest of the filler material layer 303 over the data trenches 315. The resist 351 may then be planarized by heated reflow or nano-imprint lithography. If a heated reflow process may be used, the resist 351 may be heated above its glass transition temperature and the upper surface may become planar. The resist 351 may then be cooled below the glass transition temperature which causes the resist 351 to harden.

In an embodiment, a nano-lithography planarization process may be used, a planar stamper surface may be pressed against the liquid resist 351 and the resist 351 may then be cured while in contact with the planar surface of a stamper. The curing may be performed by heating the resist 351 or exposing the resist 351 to UV light or an electron beam which causes the resist 351 to harden while in contact with the planar surface. The stamper may be then separated from the hardened resist layer 351. Resist may be deposited or applied to the filler material layer surface by spin-coating. Suitable resist materials that may be used may include: (1) UV-curable resist, liquid in form when applied and subsequently hardened by UV or electron beam irradiation induced cross-linking; and (2) thermal resist, softened by heating. See e.g., M. Colburn, I. Suey, B. J. Choi, M. Meiss, T. Bailey, S. V. Sreenivasan, J. G. Ekerdt and G. C. Wilson, J. Vac. Sci. Technol. B19, 2685 (20010; S. Chou, P. Krauss, and P. Renstom, Senience 272, 85 (1996). One example of UV-cured resist may be Monomat available from Molecular Imprints, Inc. Another possible resist material may be spin on glass: SOG such as hydro silsesquioxane (HSQ) which may be cured by exposure to an electron beam. In other embodiments, any other suitable resist material and planarization process may be used.

A selective etch may be performed on the resist 351 and the underlying filler material 303. The "selectivity" of the etch refers to the different etch rates for different materials. The etch may be highly selective if the etch rate of the filler material 303 may be etched faster than the resist material 351. Because the resist 351 covers the entire media, the initial etch rate for the media may be uniform. However, after the underlying filler material 303 has been exposed, the etch rate of the filler material 303 may be higher than the etch rate of the resist 351. The resist 351 in the recesses 321 over the servo trenches 311 may protect the recesses 321 from being etched while the exposed filler material 303 that is not covered by the resist 351 may be etched.

Figure 20:
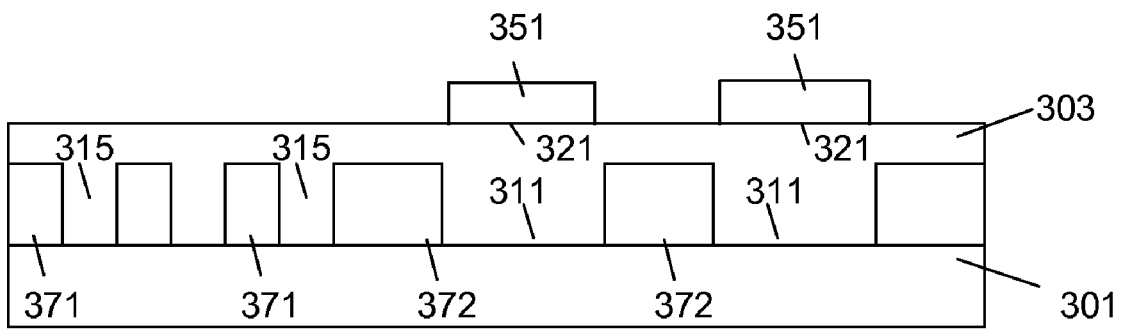
FIG. 20 illustrates a cross section of media with filler and resist material selectively etched.

With reference to FIG. 20, the DTR media is illustrated with the portions of the filler material layer 303 over the servo trenches 311 protected from the selective etch by the resist 351 and all other areas of the filler material 303 etched away. The selective etching may remove material from the upper surface of the filler layer 303 until the upper surface is approximately planar with the upper surface filler material 303 at the bottom of the recesses 321. The timing of the etch may be based upon the predetermined etch rate of the filler material in nm/sec and depth of the recesses 321 in nm. Thus, the duration of the etch may be stopped at approximately time=depth of the recess/etch rate. It may also be possible to monitor the processing to determine the filler material thickness. When the target filler material reaches the target thickness, the etch processing may be stopped. The etch chemistry may depend upon the filler material and resist being used. For example, if the filler material may be SiN and the resist may be Monomat, a fluorine based RIE process may be used to etch the resist 351 and filler material 303. In the RIE process, the media may be placed in a vacuum chamber and exposed to a fluorine based plasma which etches the resist 351 from the filler material 303.

Figure 21:
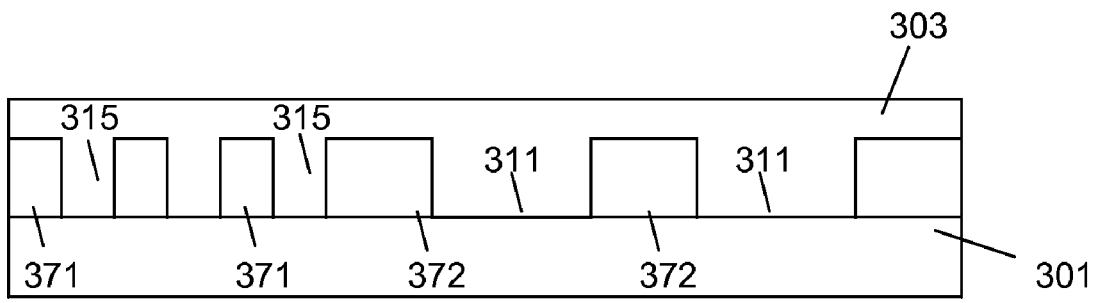
FIG. 21 illustrates a cross section of media with the resist material removed.

With reference to FIG. 21, after the selective etch may be completed, the remaining resist material 351 may be removed with an ashing process such as an oxygen ($O_2$) RIE. The media may be placed in a vacuum chamber and exposed to an oxygen plasma which etches the resist 351 but may not remove or damage the filler layer material 303. In other embodiments, any other suitable resist material removal process may be used. The removal of the resist 351 may complete a servo trench planarization of the process.

Figure 22:
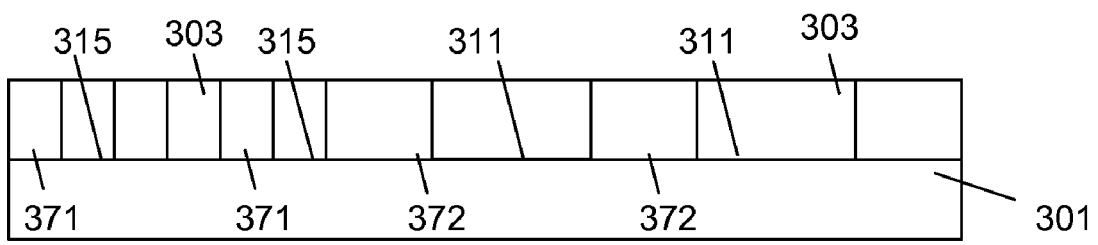
FIG. 22 illustrates a cross section of media with a filler layer planarized.

With reference to FIG. 22, in an embodiment an IBE milling process may be performed to remove some of the filler material 303 over the magnetic data tracks 371 and the magnetic servo tracks 372. Thus, the upper surface of the filler material layer 303 may be planar over with the upper surfaces of the data trenches 315 and the servo trenches 311. The IBE milling may also planarize the upper surface of the media.

Figure 23:
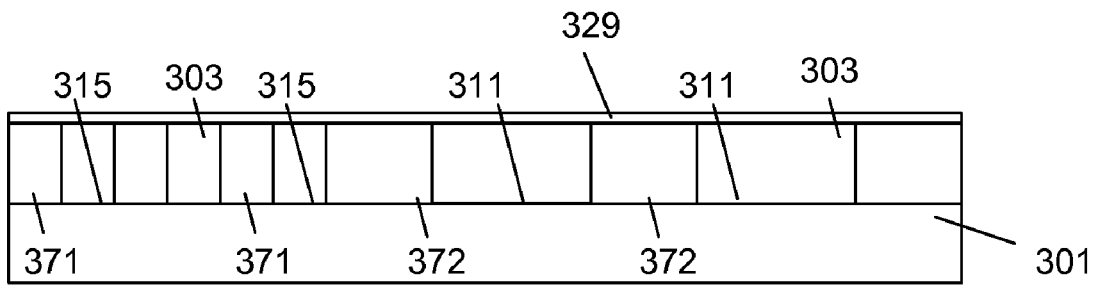
FIG. 23 illustrates a cross section of media with a protective layer.

With reference to FIG. 23, a carbon layer 329 may also be deposited on the top surface of the media 301 that acts as a protective coating and prevents damage to the media when there may be contact with a disk drive head. The carbon layer 329 should have good adhesion to the filler material 303 and the magnetic data tracks 371 and servo tracks 372 to prevent delamination. The carbon layer 329 may be further planarized to further optimize smoothness. In an embodiment, a target smoothness of the upper surface of the carbon layer 329 may be an RMS<1 nm.

Figure 24:
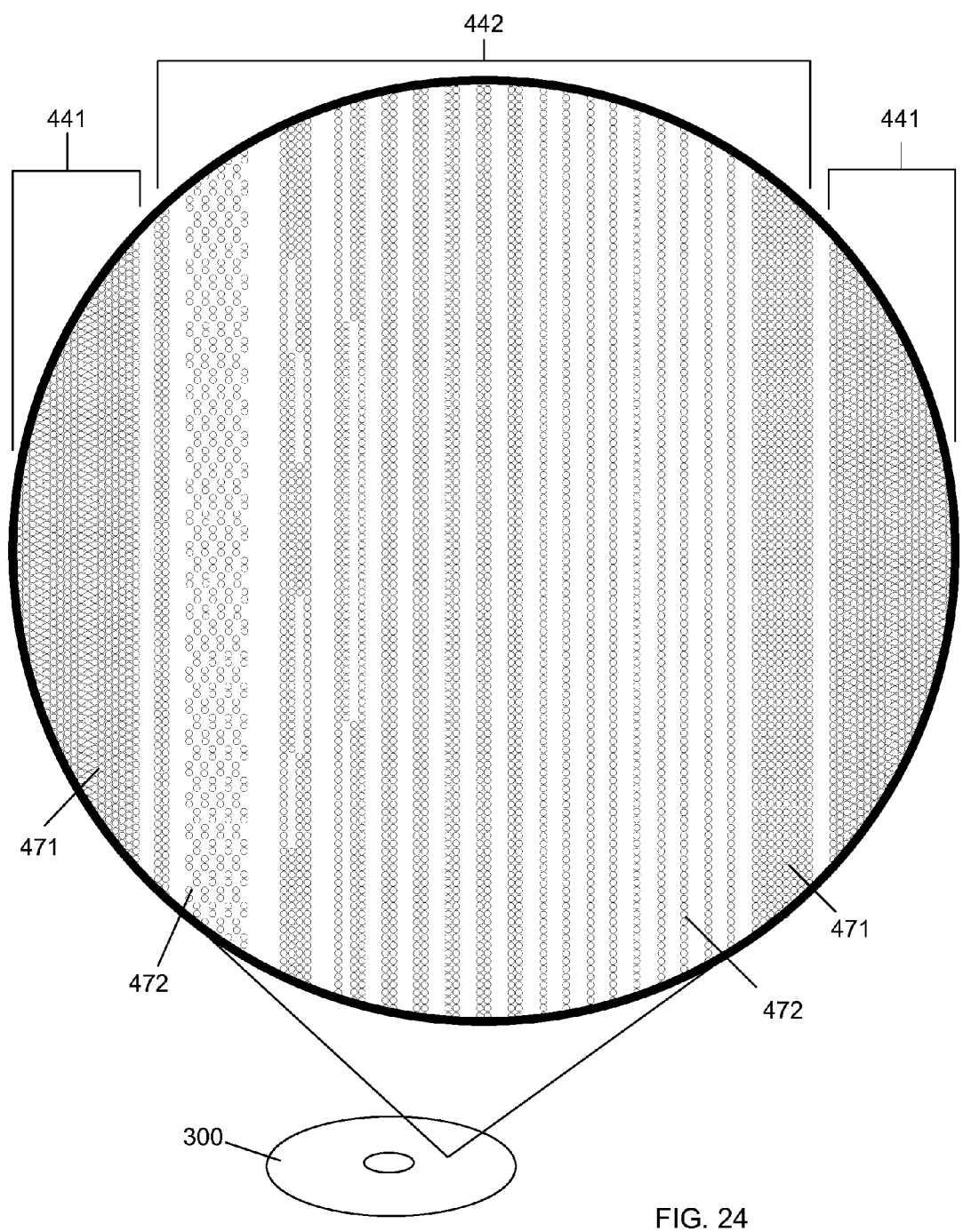
FIG. 24 illustrates an enlarged view of a portion of a BPM media disk.

The described planarization invention may also be applicable to bit patterned media, BPM. With reference to FIG. 24, a portion of a BPM 300 may be illustrated having data regions 441 made up of hard magnetic material data islands 471. Each island 471 may be a discrete data storage bit. In an embodiment, the islands 471 may be arranged in a close packed configuration. Therefore, the data trenches between the adjacent data islands 471 may be small and have small width/depth aspect ratios. The BPM 300 also has servo regions 442 that have servo tracks that may be made of servo islands 472 of a hard magnetic material. The servo islands 472 may be larger than the data islands 471 and the servo islands 472 may be arranged in uniform rows and columns that may be less densely packed than the data islands 471. The servo trenches between the servo islands 472 may be larger than the data trenches and have a larger width/depth aspect ratio. The data trenches may have an aspect ratio measured between adjacent islands of about 1-2 and the servo trenches may have an aspect ratio of about 2-20 due to geometry variations. The data islands 471 and servo islands 472 have been simplified for illustrative purposes and may not be shown to scale. Like the DTR media, the servo trenches and the data trenches of the BPM 300 may also be filled with a non-magnetic filler material so the upper surface of the BPM 300 may be planar.

Figure 25:
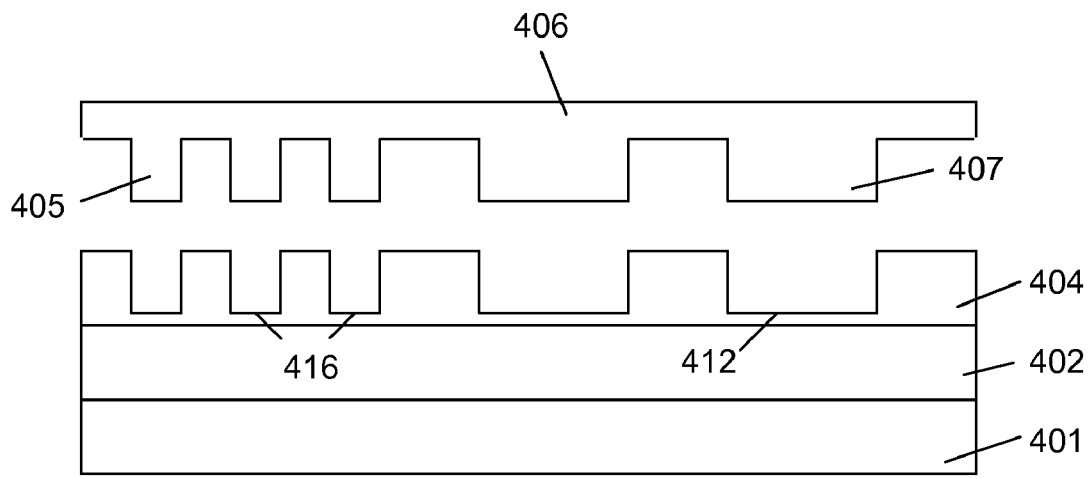
FIG. 25 illustrates a cross section of a media having a patterned resist formed by a stamper.

With reference to FIG. 25, a layer of a hard magnetic material 402 may be deposited on a substrate 401 and a layer of imprint resist material 404 may be deposited on the hard magnetic material 402. A rigid or a flexible stamper 406 having a patterned surface with servo trench features 405 and data recesses 407 may be pressed into the imprint resist layer 204 to emboss the pre-determined stamper pattern in the resist 404. The resist 404 may be cured by heat or exposure to ultra violet (UV) light while the stamper 406 may be in contact with the resist 404. After the resist layer 404 may be cured the stamper 406 may be removed, leaving the pattern of servo trench features 422 and data recesses 426 in the resist layer 404. The processes used for patterning the resist were described above with reference to FIG. 2.

Figure 26:
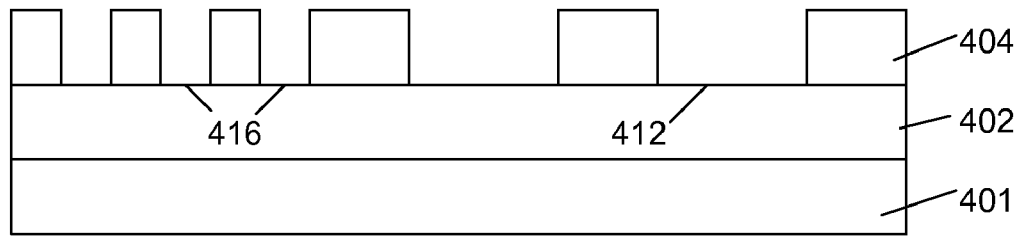
FIG. 26 illustrates a cross section of a media having a descummed patterned resist.

With reference to FIG. 26, a descumming process may be used to remove the resist material 404 from the bottom portions of the servo trench features and data trench features in the resist layer 404. The descumming may be performed by a plasma process that bombards the resist with ions to remove the small amount of resist particles at the bottoms of the servo trench features 412 and data trench features 416. The descumming processes were described above with reference to FIG. 3.

Figure 27:
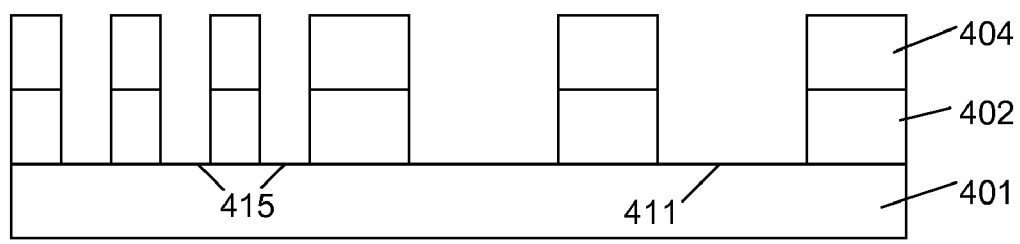
FIG. 27 illustrates a cross section of a media having etched trenches and a patterned resist layer.
Figure 28:
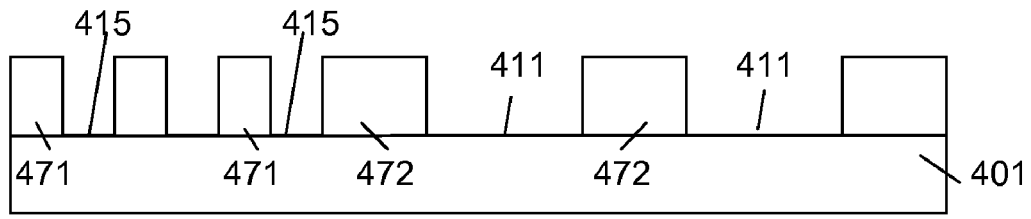
FIG. 28 illustrates a cross section of a media with trenches in the upper surface.
Figure 29:
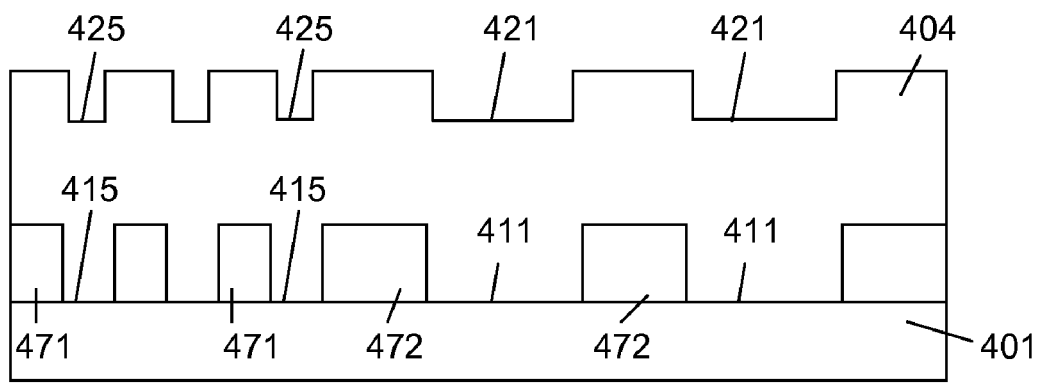
FIG. 29 illustrates a cross section of media with a layer of filler material deposited on the upper media surface.

With reference to FIG. 27, after the residual resist material 404 may be removed, the hard magnetic layer 402 may be etched to form the data trenches 415 between the hard magnetic islands 471 and the servo trenches 411 between the hard magnetic servo tracks 472. With reference to FIG. 28, the resist material 404 may be removed in an ashing process from the top surfaces of the hard magnetic islands 471 and the hard magnetic servo tracks 472. With reference to FIG. 29, a layer of filler material 404 may be deposited over the substrate 401, the magnetic islands 471 and the magnetic servo tracks 472. The filler material 404 may conform to the topography and provides step coverage of the magnetic islands 471 and the magnetic servo tracks 472. The step coverage may produce data recesses 425 over the data trenches 415 and servo recesses 421 over the servo trenches 411.

Figure 30:
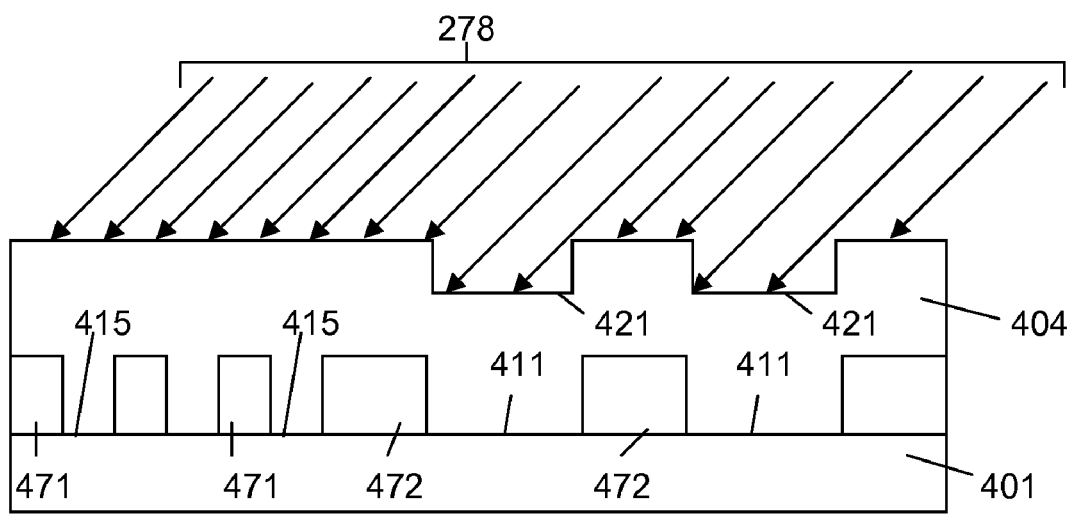
FIG. 30 illustrates an IBE of the filler material on the media.
Figure 31:
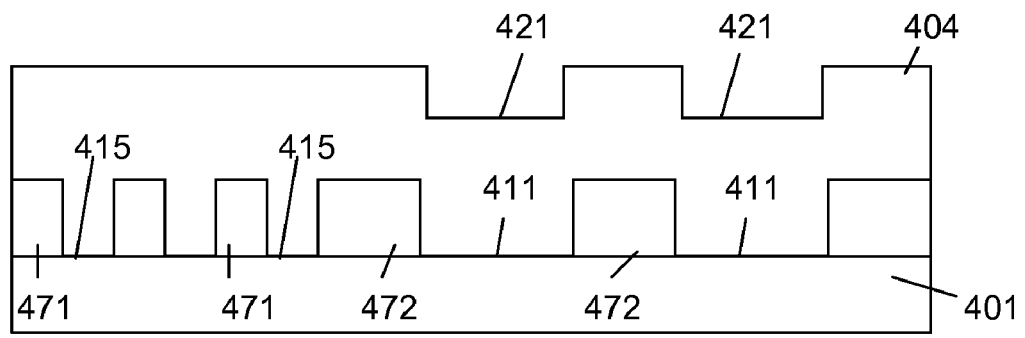
FIG. 31 illustrates a cross section of a partially planarized media with resist material deposited over the filler material.

With reference to FIGS. 30 and 31, a data trench planarization may be performed on the media using an IBE process. Ion beams 278 may be directed at an angle at the upper surface of the media 401. The IBE process may remove material from the upper surfaces of the filler layer 404 and the bottoms of the high aspect ratio servo trenches 421, but may not remove material from the bottom of the low aspect ratio data recesses 425 (shown in FIG. 29). Thus, the data recesses 425 may be removed by etching the upper surface of the filler material 404. The IBE process may also planarized until the data recesses 425 have been removed.

Figure 32:
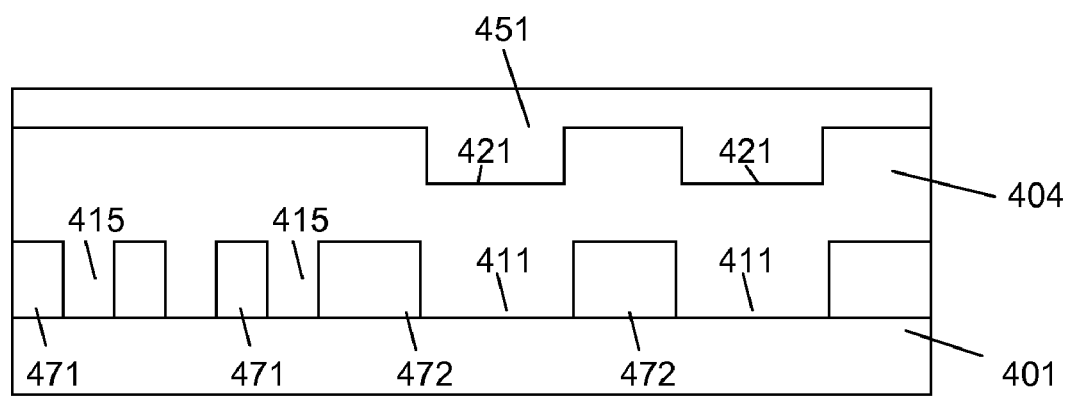
FIG. 32 illustrates a cross section of a media with resist material deposited over the filler material.
Figure 33:
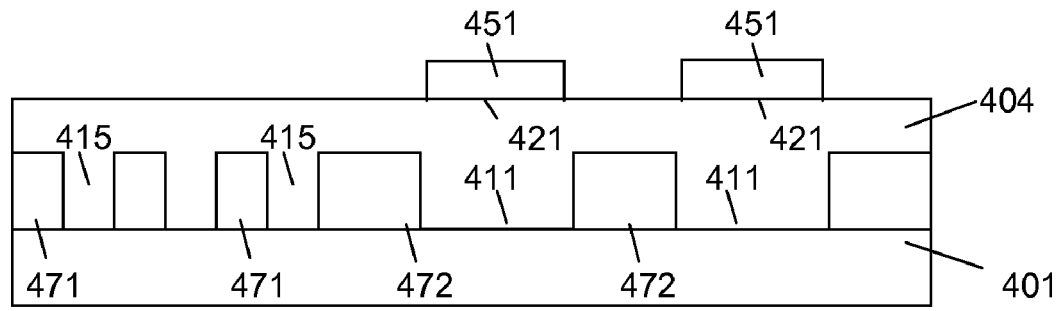
FIG. 33 illustrates a cross section of a media with filler and resist material selectively etched.

With reference to FIG. 32, a resist layer 451 may be deposited on the media over the filler material 404. The resist layer 451 may fill the servo recesses in the filler material 404. Details of the resist layer deposition have been described with reference to FIG. 19 above. With reference to FIG. 33, a selective etch may be performed on the media 401. The resist layer 451 may be etched uniformly until the filler material 404 may be exposed. The selective etch may then etch the filler material 404 at a faster rate than the resist material 451. The exposed upper surface of the filler material 404 may be etched until the upper surface may be approximately level with the bottoms of the servo recesses 421. Details of the selective etch have been described above with reference to FIG. 15.

Figure 34:
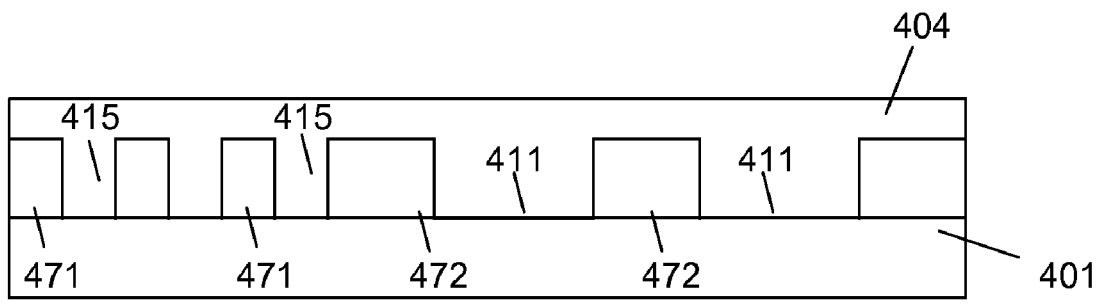
FIG. 34 illustrates a cross section of a media with the resist material removed.
Figure 35:
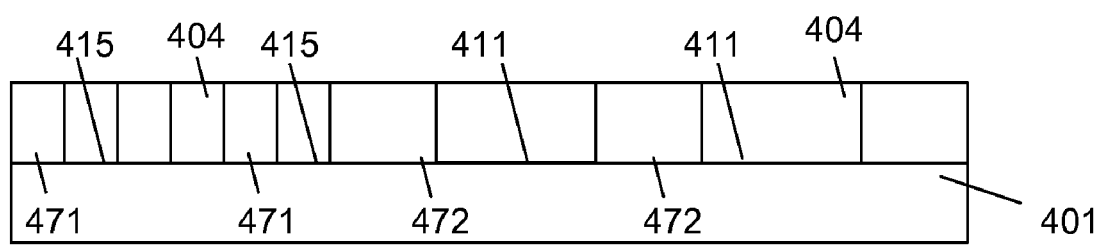
FIG. 35 illustrates a cross section of media with a filler layer planarized; and According to an embodiment.
Figure 36:
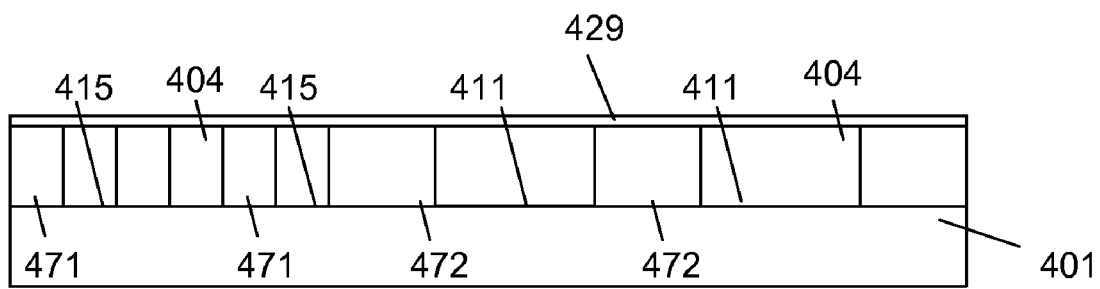
FIG. 36 illustrates a cross section of media with protective layer.

With reference to FIG. 34, an ashing process may be used to remove the resist material 451 over the servo trenches 411. Details of the ashing process have been described above with reference to FIG. 21. With reference to FIG. 35, in an embodiment an IBE milling process may be performed to remove some of the filler material 303 over the magnetic data islands 471 and the magnetic servo islands 472. Thus, the upper surface of the filler material layer 303 may be planar over with the upper surfaces of the data islands 471 and the servo islands 472. The IBE milling may also planarize the upper surface of the media. With reference to FIG. 35, a protective carbon layer 429 may be formed on the upper surface to complete the magnetic media. These processes have been described above with reference to FIG. 22.

The present disclosure, in various embodiments, includes components, methods, processes, systems and/or apparatus substantially as depicted and described herein, including various embodiments, subcombinations, and subsets thereof.

What may be claimed is:
1. A method comprising:
   etching data trenches and servo trenches in a hard magnetic layer of a substrate;
   depositing a filler material layer over the magnetic material, the filler material layer filling the data trenches and the servo trenches, an upper surface of the filler material layer having data recesses over the data trenches and servo recesses over the servo trenches;

planarizing the upper surface of the filler material to remove the data recesses and not completely remove the servo recesses;

coating the filler material layer and filling the servo recesses with a resist material and curing the resist material;

etching the substrate with an etch process that selectively etches the filler material at a faster rate than the resist material, the etching continuing until the upper surface of the filler material is substantially planar with the servo recesses; and removing the resist material remaining over the servo trenches.

2. The method of claim 1 further comprising:
etching the filler material to expose at least a portion of the hard magnetic layer after the removing of the resist material.

3. The method of claim 2 further comprising:
planarizing the top surface of the substrate after the etching of the filler material.

4. The method of claim 3 further comprising:
depositing a layer of protective carbon on the top surface of the substrate.

5. The method of claim 1 wherein the planarizing of the upper surface of the filler material comprises ion beam etch (IBE) processing.

6. The method of claim 1 wherein the planarizing of the upper surface of the filler material etches the filler material at bottom surfaces of the servo trenches.

7. A method comprising:
depositing a filler material layer over a top surface of a substrate having data trenches between magnetic data features and servo trenches between magnetic servo features, an upper surface of the filler material layer having data recesses over the data trenches and servo recesses over the servo trenches;

planarizing the filler material layer until the data recesses are substantially removed and at least some of the servo recesses remain over the servo trenches;

depositing a resist layer on the filler material layer and in the servo recesses;

curing the resist layer;

etching the resist layer with an etch process that selectively etches the resist layer at a slower rate than the filler material layer; and stopping the etching after the resist layer has been removed from the filler material layer over the data trenches and while portions of the resist layer remains over the servo trenches.

8. The method of claim 7, wherein the stopping of the etching occurs when the filler material layer over the data trenches is approximately planar with the filler material layer over the servo trenches.

9. The method of claim 7 further comprising:
planarizing the resist layer after the depositing of the resist layer.

10. The method of claim 9 wherein the planarizing the resist layer may be performed by heated reflow of the resist layer.

11. The method of claim 9 wherein the planarizing of the resist layer may be performed by nano-imprint lithography.

12. The method of claim 7 further comprising:
removing the resist layer adjacent the servo trenches; and
planarizing the filler material layer adjacent the data trenches and the servo trenches.

13. The method of claim 7 wherein the planarizing of the filler material includes ion beam etch (IBE) processing.

14. A method comprising:
forming a filler material layer on a top surface of a substrate with data trenches between data features and servo trenches between servo features, an upper surface of the filler material layer having data recesses adjacent the data trenches and servo recesses adjacent the servo trenches;

planarizing the filler material layer;

stopping the planarizing of the filler material after the data recesses in the upper surface of the filler material layer have been removed;

applying resist material to a top surface of the substrate and the servo recesses;

curing the resist material;

selectively etching the top surface of the substrate, the selective etching removing the resist material at a slower rate than the filler material until the filler material layer is substantially planar; and removing the resist material remaining adjacent to the servo trenches.

15. The method of claim 14 further comprising:
etching the filler material to expose at least a portion of the data features and the servo features after the removing of the resist material.

16. The method of claim 15 further comprising:
planarizing the top surface of the substrate after the etching of the filler material.

17. The method of claim 14 further comprising:
depositing a layer of protective carbon on the top surface of the substrate.

18. The method of claim 14 further comprising:
planarizing the resist material after the applying the resist material.

19. The method of claim 18 wherein the planarizing of the resist material includes heated reflow of the resist material.

20. The method of claim 19 wherein the planarizing of the resist layer includes nano-imprint lithography processing.

* * * * *